US012043254B2

(12) United States Patent
Nakatsuji et al.

(10) Patent No.: US 12,043,254 B2
(45) Date of Patent: Jul. 23, 2024

(54) VEHICLE CONTROL DEVICE AND VEHICLE CONTROL METHOD

(71) Applicant: Mitsubishi Electric Corporation, Tokyo (JP)

(72) Inventors: Shuuhei Nakatsuji, Tokyo (JP); Yu Takeuchi, Tokyo (JP); Kazuo Hitosugi, Tokyo (JP); Fumiaki Kadoya, Tokyo (JP); Kazushi Maeda, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 662 days.

(21) Appl. No.: 17/284,986

(22) PCT Filed: Mar. 4, 2019

(86) PCT No.: PCT/JP2019/008275
§ 371 (c)(1),
(2) Date: Apr. 13, 2021

(87) PCT Pub. No.: WO2020/166092
PCT Pub. Date: Aug. 20, 2020

(65) Prior Publication Data
US 2021/0347359 A1    Nov. 11, 2021

(30) Foreign Application Priority Data
Feb. 15, 2019   (JP) ................. 2019-025037

(51) Int. Cl.
*B60W 10/18*   (2012.01)
*B60W 10/04*   (2006.01)
(Continued)

(52) U.S. Cl.
CPC ............ *B60W 30/12* (2013.01); *B60W 10/04* (2013.01); *B60W 10/18* (2013.01); *B60W 10/20* (2013.01);
(Continued)

(58) Field of Classification Search
CPC ...... B60W 30/12; B60W 10/04; B60W 10/18; B60W 10/20; B60W 2540/18;
(Continued)

(56) References Cited

U.S. PATENT DOCUMENTS

2004/0262063 A1* 12/2004 Kaufmann ........... B62D 15/025
                                                180/169
2019/0369614 A1* 12/2019 Parks ................... G05D 1/0088

FOREIGN PATENT DOCUMENTS

CN          102591332 A    *  7/2012
DE       112011103834 T5    *  9/2013 ............ B60W 10/04
(Continued)

OTHER PUBLICATIONS

DE 112011103834 T5 English translation (Year: 2023).*
(Continued)

*Primary Examiner* — Jelani A Smith
*Assistant Examiner* — Paul A Castro
(74) *Attorney, Agent, or Firm* — Sughrue Mion, PLLC; Richard C. Turner

(57) ABSTRACT

A lane information detection unit detects the shape and the road width of a traveling lane of a vehicle. A present transverse position detection unit detects a present transverse position indicating a present traveling position of the vehicle in the width direction of the traveling lane. A driver-corresponding transverse position setting unit sets a driver-corresponding transverse position corresponding to a driving tendency of a driver. An upper/lower limit value setting unit sets upper/lower limit values that the driver-corresponding transverse position can take, in accordance with the road width. Then, when change in the road width is detected, a transverse position control amount calculation unit sets, as a target transverse position, the driver-corresponding transverse position within the upper/lower limit (Continued)

values in which the change is reflected, and calculates a transverse position control amount for the vehicle from the present transverse position of the vehicle.

22 Claims, 14 Drawing Sheets

(51) Int. Cl.
 *B60W 10/20* (2006.01)
 *B60W 30/12* (2020.01)
(52) U.S. Cl.
 CPC ..... *B60W 2540/18* (2013.01); *B60W 2552/05* (2020.02); *B60W 2552/20* (2020.02); *B60W 2552/30* (2020.02); *B60W 2710/18* (2013.01); *B60W 2710/207* (2013.01); *B60W 2720/10* (2013.01); *B60W 2720/12* (2013.01)
(58) Field of Classification Search
 CPC ......... B60W 2552/05; B60W 2552/20; B60W 2552/30; B60W 2710/18; B60W 2710/207; B60W 2720/10; B60W 2720/12; B60W 2552/00; B60W 2552/53; B60W 2720/106; B62D 6/00; G08G 1/16
 See application file for complete search history.

(56) References Cited

FOREIGN PATENT DOCUMENTS

| DE | 102017202556 A1 * | 8/2017 | ............ B60W 30/12 |
|---|---|---|---|
| JP | 2001-1921 A | 1/2001 | |
| JP | 2003-44137 A | 2/2003 | |

OTHER PUBLICATIONS

DE 102017202556 English translation (Year: 2023).*
CN102591332 English translation (Year: 2023).*
International Search Report for PCT/JP2019/008275 dated May 7, 2019 (PCT/ISA/210).

* cited by examiner

VEHICLE CONTROL DEVICE AND VEHICLE CONTROL METHOD

CROSS REFERENCE TO RELATED APPLICATIONS

This application is a National Stage of International Application No. PCT/JP2019/008275 filed Mar. 4, 2019, claiming priority based on Japanese Patent Application No. 2019-025037 filed Feb. 15, 2019.

TECHNICAL FIELD

The present disclosure relates to a vehicle control device and a vehicle control method.

BACKGROUND ART

A vehicle control device for assisting steering so as to cause a vehicle to travel along a lane is called a "lane keeping assist system" or the like, and is being developed (for example, Patent Document 1).

In general, such a vehicle control device basically keeps the position in the transverse direction of the vehicle (hereinafter, referred to as "transverse position"), at the center of the lane, and meanwhile, corrects the transverse position in accordance with the driver's preference and the tendency (habit) of the driving, thereby preventing interference with the driver's steering and thus achieving steering assist of reducing the risk of contact with an obstacle (for example, Patent Document 2).

CITATION LIST

Patent Document

Patent Document 1: Japanese Laid-Open Patent Publication No. 2001-001921 (pages 3-5, FIG. 2)
Patent Document 2: Japanese Laid-Open Patent Publication No. 2003-44137 (pages 3-4, FIG. 1)

SUMMARY OF THE INVENTION

Problems to be Solved by the Invention

In the vehicle control device in Patent Document 2, in a case where a road shoulder adjacent to the traveling lane of the own vehicle is narrow, a case where an adjacent lane is under construction, or the like, since the occupant feels anxiety about the road shoulder or the construction lane, a target transverse position is automatically changed to achieve such traveling as to eliminate the driver's anxiety.

However, in this vehicle control device, when the driver encounters a situation of causing anxiety, the present transverse position of the own vehicle is necessarily set to a predetermined safe target transverse position, and therefore might differ from a traveling line that the driver prefers (that is, the target transverse position is never corrected or changed).

For example, in a case where the present transverse position of the own vehicle is set to a target transverse position on the basis of the driver's preference and then the road width is narrowed during traveling, even if the present transverse position of the own vehicle is a safe position, the present transverse position is forcibly set to the preset target position, thus causing a problem of having a tendency of traveling at a traveling position different from the driver's preference.

The present disclosure has been made to solve the above problem, and an object of the present disclosure is to provide a vehicle control device and a vehicle control method that are adaptable to the driver's preference and achieve safe automated traveling of a vehicle.

Solution to the Problems

A vehicle control device according to the present disclosure is a vehicle control device mounted on a vehicle and configured to control traveling of the vehicle, the vehicle control device including: a lane information detection unit for detecting a shape and a road width of a traveling lane of the vehicle; a present transverse position detection unit for detecting a present transverse position indicating a position of the vehicle in a width direction of the traveling lane where the vehicle is traveling at present; a driver-corresponding transverse position setting unit for setting a driver-corresponding transverse position indicating a position of the vehicle in the width direction of the traveling lane so as to correspond to a driving tendency of a driver of the vehicle; an upper/lower limit value setting unit for setting upper/lower limit values that the driver-corresponding transverse position is allowed to take, in accordance with the road width; a transverse position control amount calculation unit which sets, as a target transverse position, the driver-corresponding transverse position within the upper/lower limit values set by the upper/lower limit value setting unit, and calculates a transverse position control amount for the vehicle from the present transverse position of the vehicle; a target steering angle calculation unit for calculating a target steering angle for the vehicle on the basis of the transverse position control amount calculated by the transverse position control amount calculation unit and the shape of the traveling lane; and a vehicle steering unit for steering the vehicle on the basis of the target steering angle calculated by the target steering angle calculation unit, wherein, when change in the road width is detected, the transverse position control amount calculation unit calculates the transverse position control amount for the vehicle on the basis of the upper/lower limit values in which the change in the road width is reflected.

Effect of the Invention

The vehicle control device according to the present disclosure can adapt to the driver's preference and achieve safe automated traveling of a vehicle.

DESCRIPTION OF EMBODIMENTS

Embodiment 1

Figure 1:
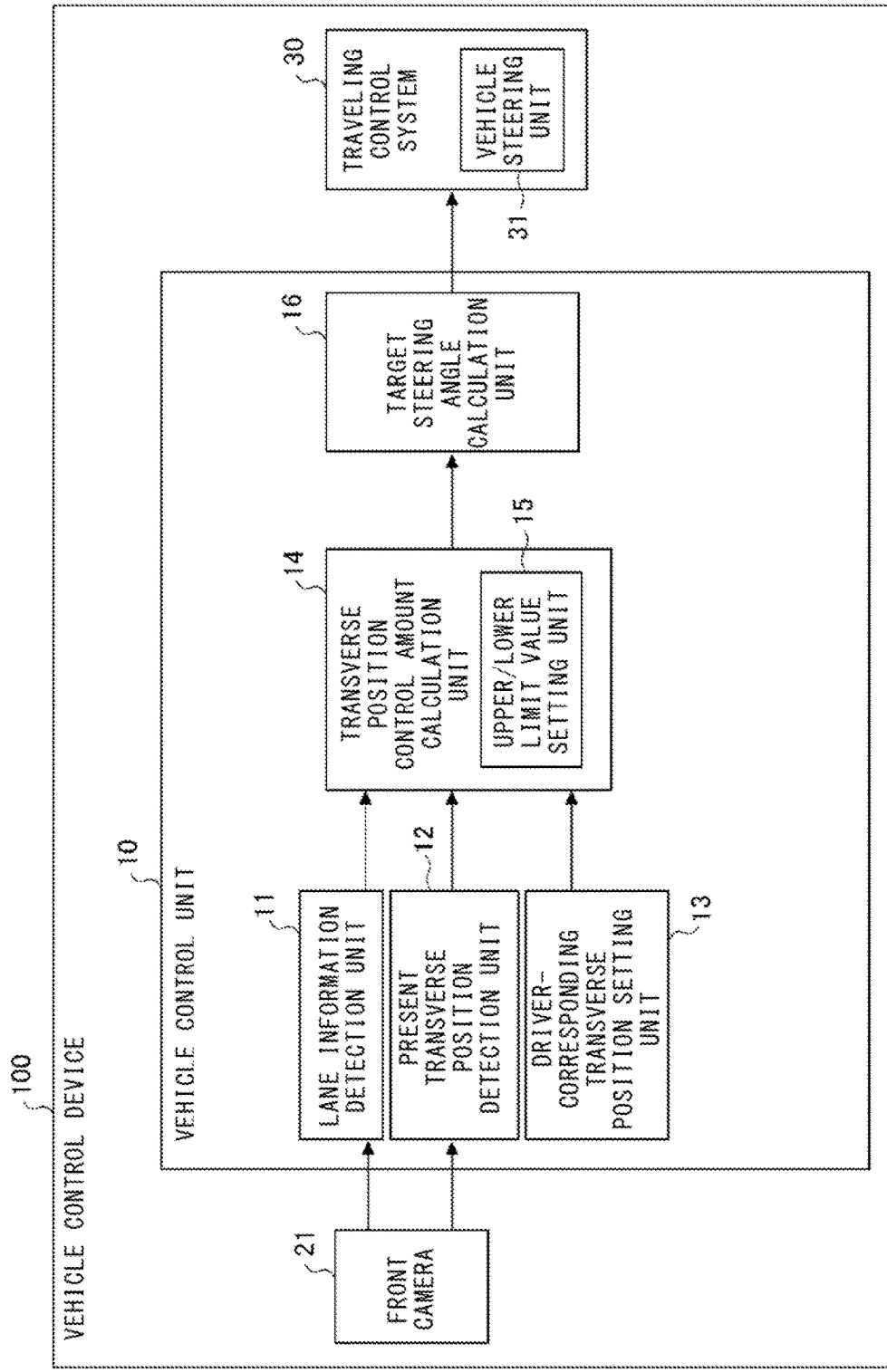
FIG. 1 is a block diagram showing the configuration of a vehicle control device according to embodiment 1.

FIG. 1 is a block diagram showing the configuration of a vehicle control device according to embodiment 1.

In FIG. 1, a vehicle control device 100 includes a front camera 21, a vehicle control unit 10, and a traveling control system 30 described below.

In the following description, a vehicle on which the vehicle control device 100 is mounted is referred to as "own vehicle". The vehicle control device 100 mainly controls a steering mechanism of the own vehicle.

The front camera 21 is an imaging device mounted on the own vehicle, and takes a video (frontward video) of a frontward area as seen from the own vehicle. Then, the front camera 21 outputs the taken video as a frontward video to a lane information detection unit 11 and a present transverse position detection unit 12 described later.

The traveling control system 30 controls an acceleration mechanism, a braking mechanism, a steering mechanism, or the like of the own vehicle, thereby controlling traveling of the own vehicle. A vehicle steering unit 31 controls the steering mechanism on the basis of a target steering angle calculated by a target steering angle calculation unit 16 described later, to steer the vehicle.

The vehicle control unit 10 is configured as follows.

The lane information detection unit 11 analyzes the frontward video of the own vehicle taken by the front camera 21, to detect the shape (curvature) and the road width of the traveling lane frontward of the own vehicle.

The present transverse position detection unit 12 analyzes the frontward video of the own vehicle taken by the front camera 21, to detect the transverse position of the own vehicle in the traveling lane at present (hereinafter, referred to as "present transverse position"). A method for detecting the curvature of the traveling lane and the present transverse position from the frontward video of the own vehicle is well-known technology (for example, Japanese Laid-Open Patent Publication No. 2017-74838), and therefore the description thereof is omitted.

A driver-corresponding transverse position setting unit 13 sets the transverse position of the own vehicle corresponding to the driver's preference or the driving tendency, as a driver-corresponding transverse position.

The driver-corresponding transverse position setting unit 13 may be formed as a rotary switch that allows the driver to adjust the driver-corresponding transverse position in accordance with the driver's preference, for example. In this case, the driver can shift the driver-corresponding transverse position to the left side by turning the rotary switch leftward. On the other hand, the driver can shift the driver-corresponding transverse position to the right side by turning the rotary switch rightward.

In addition, the driver-corresponding transverse position setting unit 13 may be configured as a calculation device which monitors (stores) the transverse position of the own vehicle when the driver is manually steering, learns the tendency of the transverse position in the driver's driving, and calculates the driver-corresponding transverse position on the basis of the learning result.

For example, it is conceivable that the driver-corresponding transverse position setting unit 13 learns the tendency of the transverse position when the driver manually steers, and sets the average value of the movement amount of the transverse position as the driver-corresponding transverse position.

A transverse position control amount calculation unit 14 determines the transverse position control amount on the basis of the present transverse position of the own vehicle and the value of the driver-corresponding transverse position set by the driver-corresponding transverse position setting unit 13.

An upper/lower limit value setting unit 15 sets upper/lower limit values that the driver-corresponding transverse position can take. With the lane center as an origin, the left direction and the right direction with respect to the lane center are defined as positive and negative, respectively. Therefore, for example, if the own vehicle travels at 0.5 m on the left side, this is denoted as traveling at +0.5 m.

The setting of the upper/lower limit values is made in accordance with the road width. If the road width is normal (e.g., 3.6 m), the upper/lower limit values are set to ±0.7 m from the lane center, and if the road width is narrow (e.g., 3.4 m), the upper/lower limit values are set to ±0.5 m on the left and right sides.

The transverse position control amount calculation unit 14 calculates the transverse position control amount of the own vehicle on the basis of the present transverse position of the own vehicle detected by the present transverse position detection unit 12, and a target transverse position described below.

The target transverse position for the own vehicle is calculated from the driver-corresponding transverse position set by the driver-corresponding transverse position setting unit 13 and the upper/lower limit values of the driver-corresponding transverse position set by the upper/lower limit value setting unit 15.

The transverse position control amount can be calculated by using the following Expression (1).

[Transverse position control amount]=[Target transverse position]−[Present transverse position]   (1)

That is, the transverse position control amount for the own vehicle is calculated as a deviation between the target transverse position and the present transverse position of the own vehicle.

The target steering angle calculation unit 16 calculates a target steering angle for the own vehicle on the basis of the shape (curvature) of the traveling lane detected by the lane information detection unit 11, and the transverse position control amount calculated by the transverse position control amount calculation unit 14.

In embodiment 1, the target steering angle calculation unit 16 calculates the target steering angle by using the following Expression (2).

[Target steering angle]=$K1$×[Curvature of traveling lane]+$K2$×[Transverse position control amount]  (2)

In Expression (2), K1 and K2 are parameters and set in advance in accordance with the traveling characteristics of the own vehicle. The calculation expression for the target steering angle is not limited to Expression (2), and another calculation expression may be used.

The target steering angle calculated by the target steering angle calculation unit 16 is outputted to the traveling control system 30. The traveling control system 30 controls the steering mechanism of the own vehicle in accordance with the target steering angle. Thus, the own vehicle is steered so that the transverse position approaches the target transverse position, and finally, the transverse position of the own vehicle becomes the target transverse position.

Figure 3:
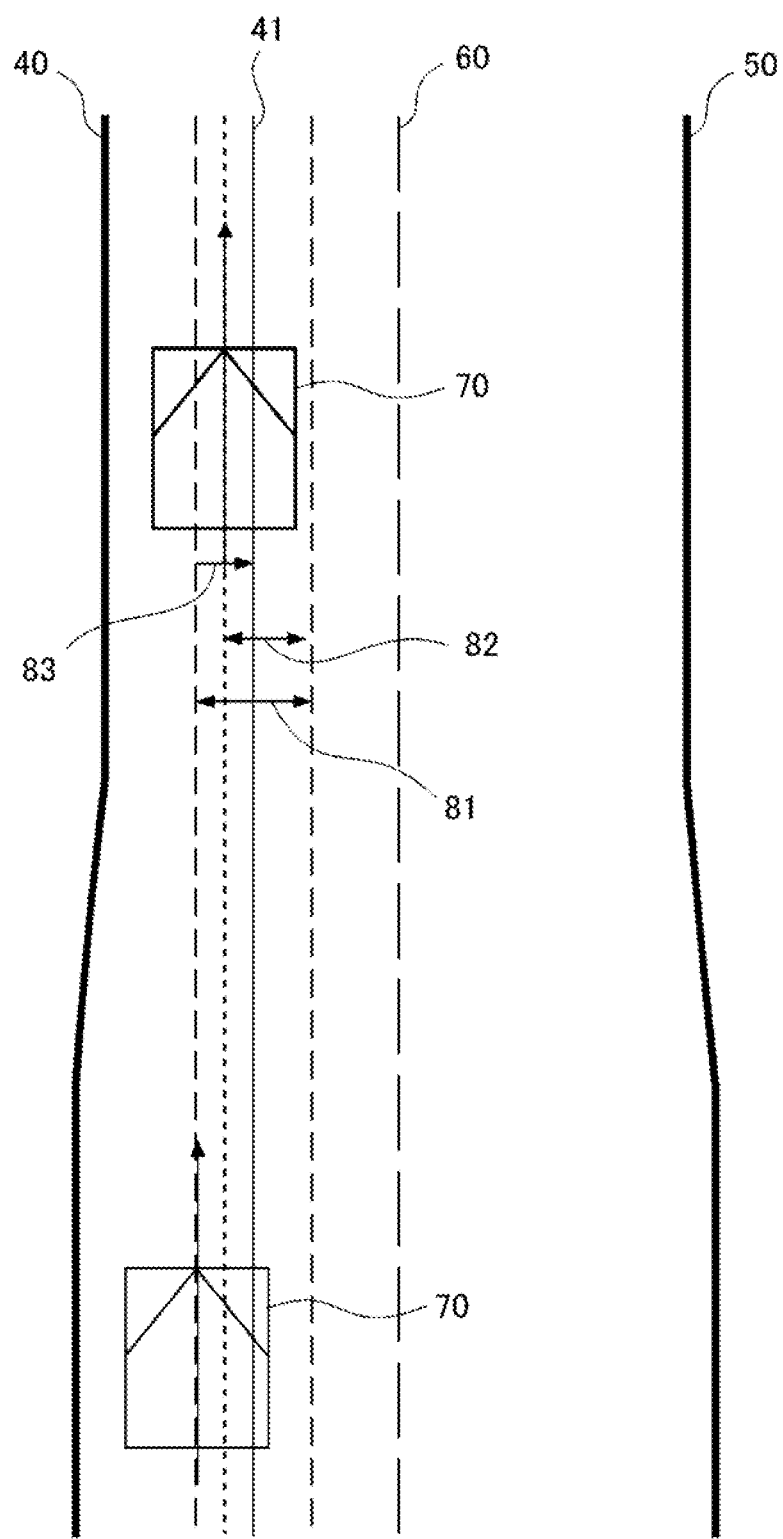
FIG. 3 is a conceptual view showing movement of an own vehicle on which the vehicle control device according to embodiment 1 is mounted.

FIG. 3 is a conceptual view showing movement of the own vehicle on which the vehicle control device according to embodiment 1 is mounted.

FIG. 3 shows movement of the own vehicle in a case where the road width decreases.

In FIG. 3, there are a first lane 40 and a second lane 50 with a center line 60 therebetween, and a lane center 41 of the first lane 40 is indicated. An own vehicle 70 is traveling on a slightly left side.

Normal upper/lower limit values 81, upper/lower limit values 82 for road width decrease, and an arrow 83 indicating that the upper/lower limit values 82 for road width decrease are used as the target transverse position, are shown.

Next, operation will be described.

Operation of the vehicle control device 100 according to embodiment 1 will be described using FIG. 2, with reference to FIG. 3.

Figure 2:
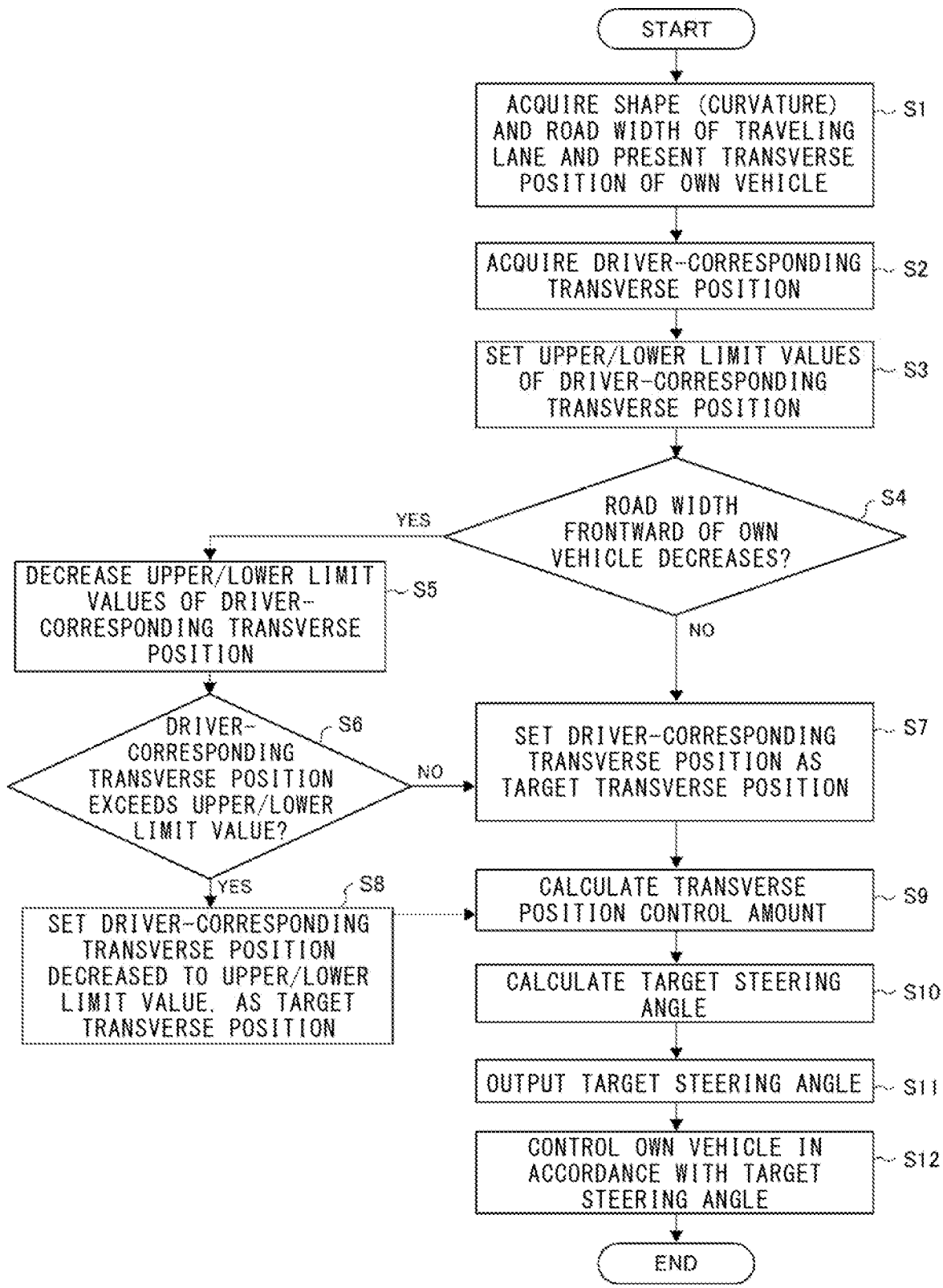
FIG. 2 is a flowchart showing a vehicle control method in the vehicle control device according to embodiment 1.

The process shown in FIG. 2 is started when the driver turns on an execution switch for automated steering by the vehicle control device 100, and is repeatedly executed while the execution switch is ON.

First, in step S1 (first step), the lane information detection unit 11 and the present transverse position detection unit 12 detect the shape (curvature) and the road width of the traveling lane frontward of the own vehicle, and the present transverse position of the own vehicle in the traveling lane, on the basis of the frontward image taken by the front camera 21.

Next, in step S2 (second step), the driver-corresponding transverse position set by the driver-corresponding transverse position setting unit 13 is acquired. Further, in step S3 (third step), upper/lower limit values of the driver-corresponding transverse position are set.

Subsequently, in step S4 (fourth step), the transverse position control amount calculation unit 14 confirms whether or not the road width frontward of the own vehicle decreases.

If the road width frontward of the own vehicle does not decrease (NO in step S4), in step S7, the transverse position control amount calculation unit 14 sets the driver-corresponding transverse position as the target transverse position.

If the road width frontward of the own vehicle decreases (YES in step S4), in step S5 (fifth step), the upper/lower limit value setting unit 15 decreases the upper/lower limit values of the driver-corresponding transverse position.

In step S5, as shown by the upper/lower limit values 82 for road width decrease in FIG. 3, only one of the upper/lower limit values for the transverse position only in the road width decrease direction may be changed depending on the driver's preference.

In step S6 subsequent to step S5, the transverse position control amount calculation unit 14 confirms whether or not the driver-corresponding transverse position exceeds the upper/lower limit value in step S5.

If the upper/lower limit value is not exceeded (NO in step S6), in step S7, the transverse position control amount calculation unit 14 sets the driver-corresponding transverse position as the target transverse position.

If the upper/lower limit value is exceeded (YES in step S6), in step S8 (sixth step), the transverse position control amount calculation unit 14 sets the driver-corresponding transverse position decreased to the upper/lower limit value, as the target transverse position.

Thus, as shown in FIG. 3, in the case where the road width frontward of the own vehicle decreases and the present transverse position exceeds the upper/lower limit value 82 for road width decrease, the target transverse position for the own vehicle is set to be the upper/lower limit value 82 for road width decrease, thus moving back toward the center side.

In step S9 (sixth step), the transverse position control amount calculation unit 14 calculates the transverse position control amount on the basis of the target transverse position and the present transverse position of the own vehicle.

That is, in step S9, the transverse position control amount calculation unit 14 calculates the transverse position control amount on the basis of the present transverse position of the own vehicle detected in step S1 and the target transverse position for the own vehicle set in step S7 or step S8, by using Expression (1).

Next, in step S10 (seventh step), the target steering angle calculation unit 16 calculates the target steering angle on the basis of the shape (curvature) of the traveling lane detected in step S1 and the transverse position control amount calculated in step S9, by using Expression (2).

Next, in step S11, the target steering angle calculated in step S10 is outputted. In step S12 (eighth step), the vehicle steering unit 31 controls the steering mechanism of the own vehicle in accordance with the target steering angle. Thus, the driver-corresponding transverse position becomes the target transverse position.

According to embodiment 1, in a case where the road width frontward of the own vehicle decreases, the upper/lower limit values of the driver-corresponding transverse position can be decreased.

Thus, it is possible to perform traveling that is safe and prioritizes ride comfort based on the driver's preference.

Embodiment 2

Figure 5:
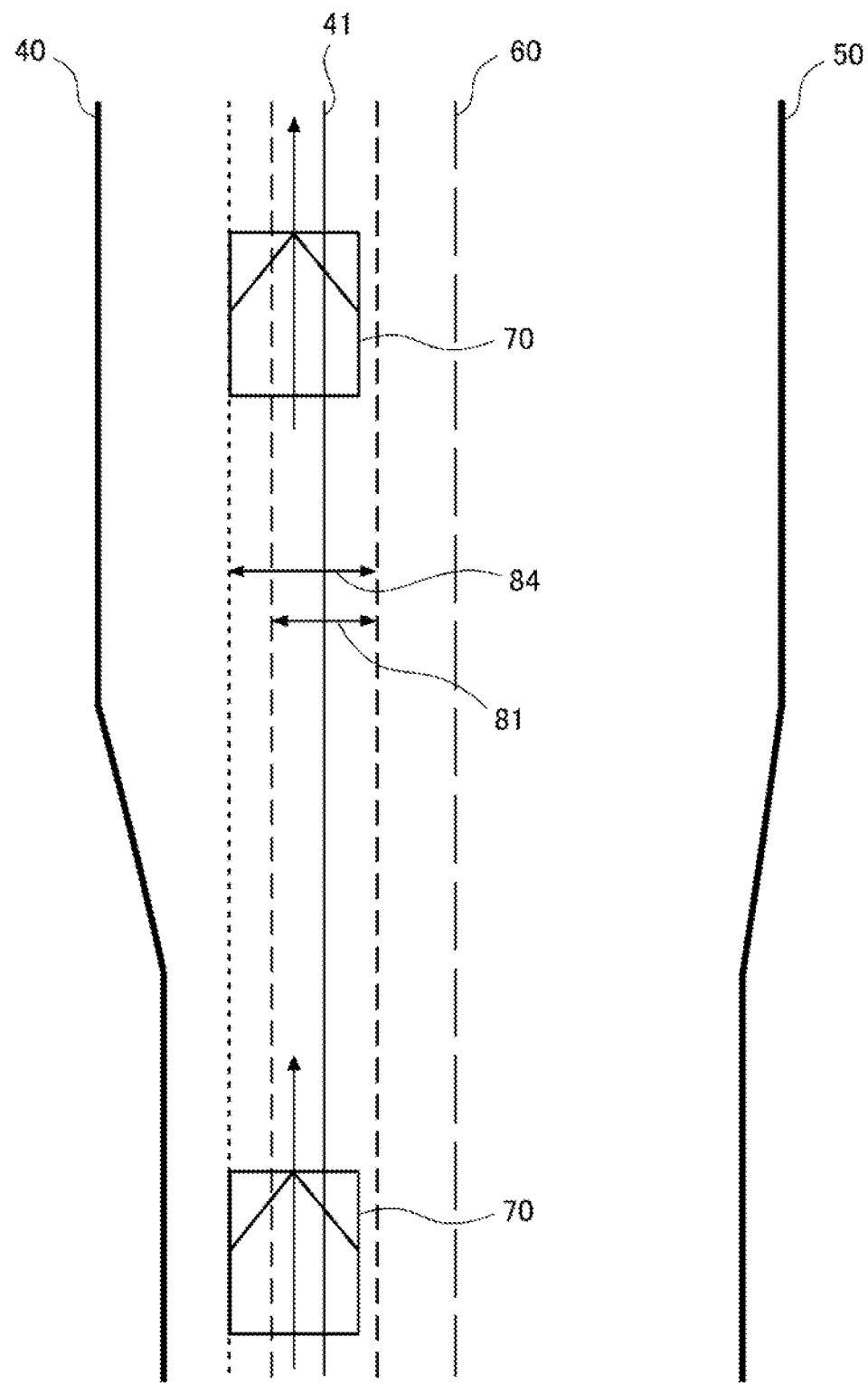
FIG. 5 is a conceptual view showing movement of an own vehicle on which the vehicle control device according to embodiment 2 is mounted.

FIG. 5 is a conceptual view showing movement of the own vehicle on which a vehicle control device according to embodiment 2 is mounted.

In FIG. 5, reference characters 40, 41, 50, 60, 70, 81 are the same as those in FIG. 3. FIG. 5 shows a case where the road width frontward of the own vehicle increases, and upper/lower limit values 84 for road width increase are shown.

Embodiment 1 has shown the example in which the upper/lower limit values of the driver-corresponding transverse position are decreased when the road width frontward of the own vehicle decreases.

In a case where the road width increases, for performing traveling more based on the driver's preference, embodiment 2 shows an example in which the upper/lower limit values for the transverse position are increased when the road width frontward of the own vehicle increases. Hereinafter, embodiment 2 will be described with reference to the drawings.

The configuration of the vehicle control device 100 in embodiment 2 is the same as that in FIG. 1.

Next, operation of the vehicle control device 100 according to embodiment 2 will be described using FIG. 4, with reference to FIG. 5.

Figure 4:
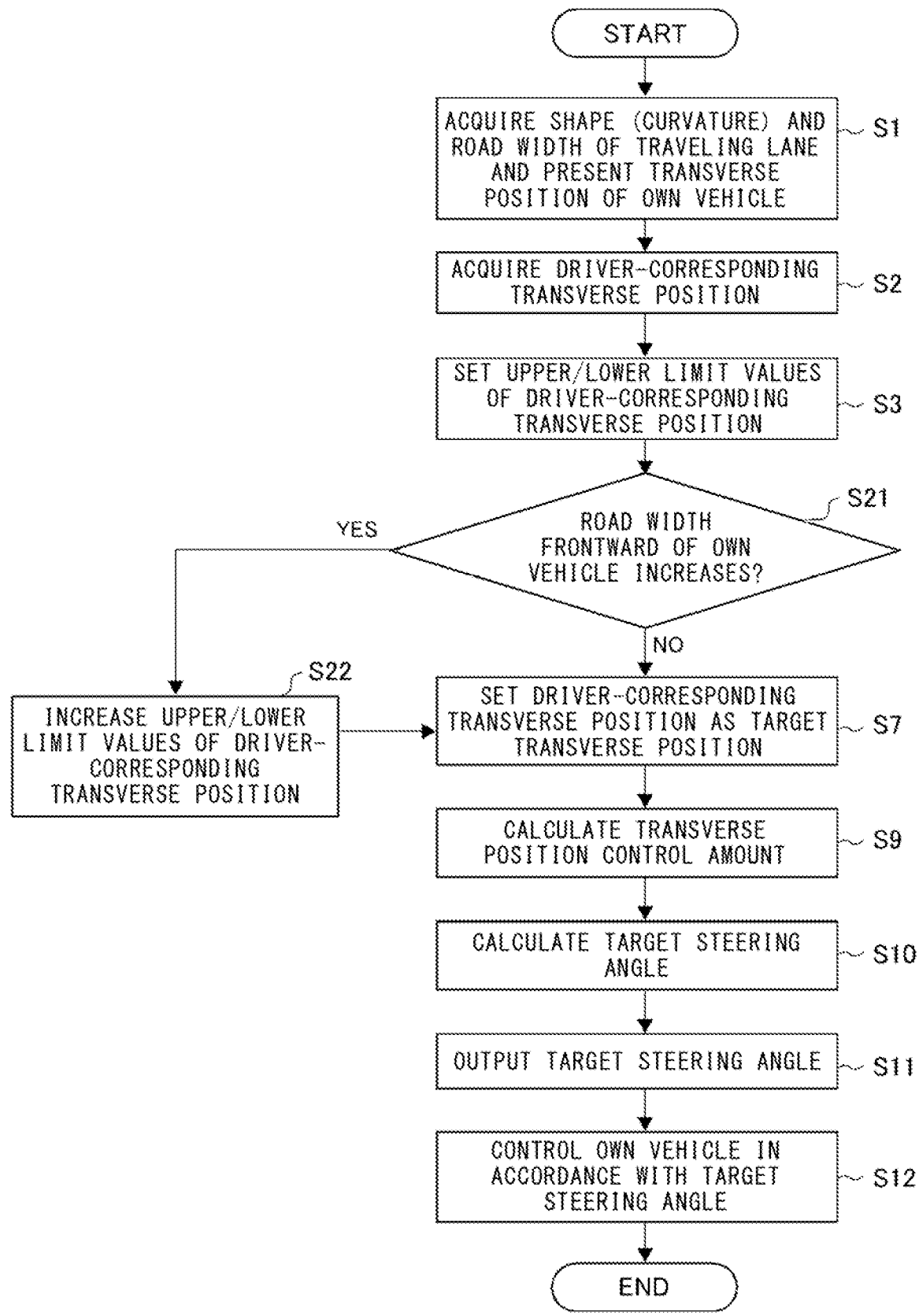
FIG. 4 is a flowchart showing a vehicle control method in a vehicle control device according to embodiment 2.

Step S1 to step S3, step S7, and step S9 to step S12 in FIG. 4 are the same processes as those in FIG. 2.

In step S21 (fourth step) subsequent to step S3, the transverse position control amount calculation unit 14 determines whether or not the road width frontward of the own vehicle increases.

In step S21, if the road width does not increase, the process proceeds to step S7.

If the road width frontward of the own vehicle increases, in step S22 (fifth step), the upper/lower limit value setting unit 15 increases the upper/lower limit values of the driver-corresponding transverse position.

As shown in FIG. 5, in the case where the road width frontward of the own vehicle increases, the upper/lower limit values are increased to the upper/lower limit values 84 for road width increase, whereby traveling based on the driver's preference can be more performed.

As in embodiment 1, only one of the upper/lower limit values for the transverse position may be changed.

As in FIG. 3, it is also possible to perform traveling in accordance with the driver's preference by increasing the upper/lower limit value for the transverse position only in the road width increase direction.

According to embodiment 2, in a case where the road width frontward of the own vehicle increases, the upper/lower limit values of the driver-corresponding transverse position can be increased.

Thus, it is possible to perform traveling so as to prioritize ride comfort based on the driver's preference more.

Embodiment 3

Figure 7:
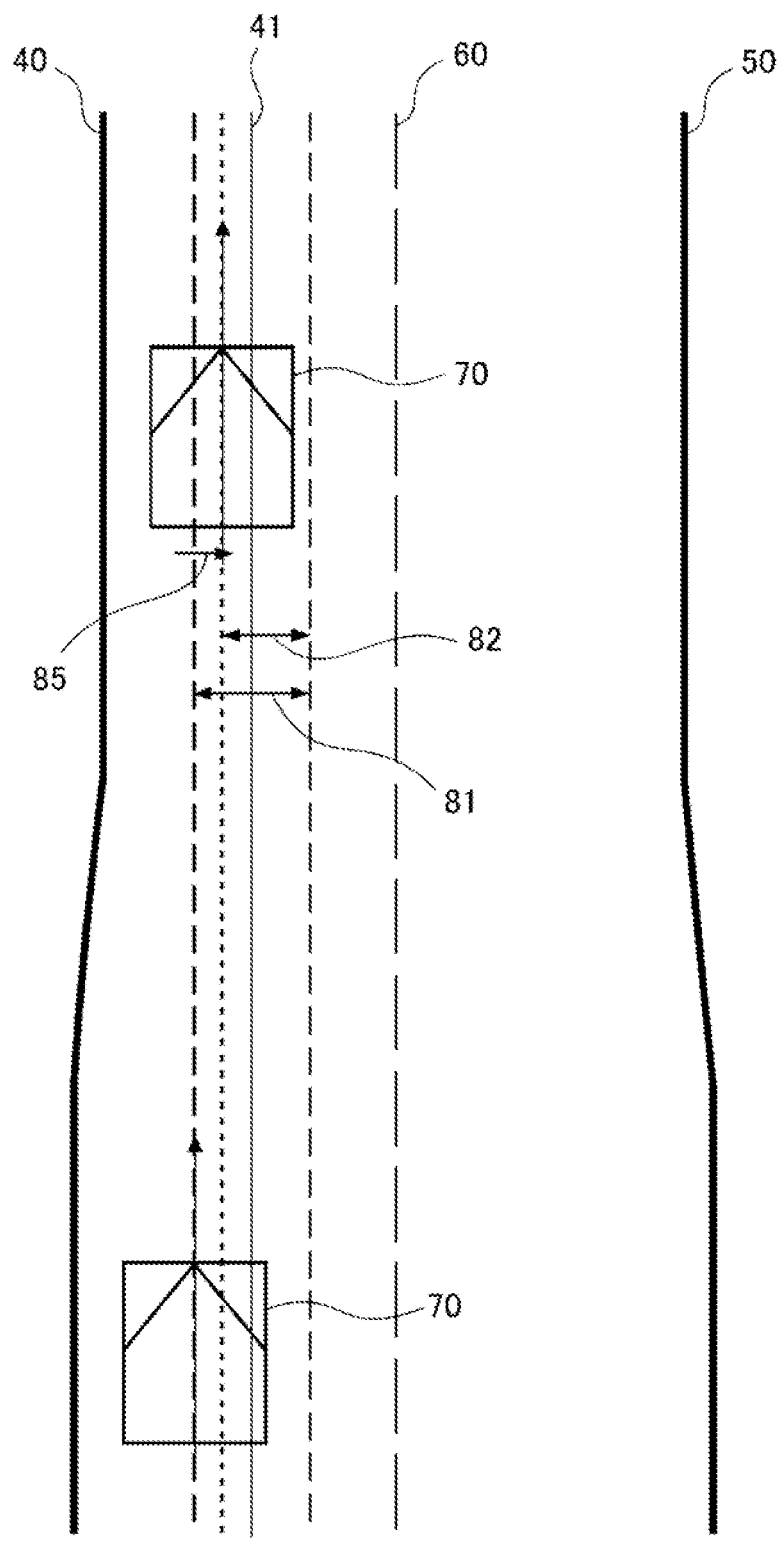
FIG. 7 is a conceptual view showing movement of an own vehicle on which the vehicle control device according to embodiment 3 is mounted.

FIG. 7 is a conceptual view showing movement of the own vehicle on which a vehicle control device according to embodiment 3 is mounted.

In FIG. 7, reference characters 40, 41, 50, 60, 70, 81, 82 are the same as those in FIG. 3. In FIG. 7, an arrow 85 indicates that, in a case where the frontward road width decreases, the driver-corresponding transverse position is gradually changed over time, to be set as the target transverse position.

In embodiment 1, in a case where the road width frontward of the own vehicle decreases, the upper/lower limit values of the driver-corresponding transverse position are decreased. Therefore, when the driver-corresponding transverse position of the own vehicle exceeds the upper/lower limit value, the target transverse position for the own vehicle immediately becomes the upper/lower limit value, thus moving back toward the center side.

As a result, the driver feels anxiety and traveling not based on the driver's preference is performed. Embodiment 3 shows an example in which the target transverse position can be changed over time. Hereinafter, embodiment 3 will be described with reference to the drawings.

The configuration of the vehicle control device 100 in embodiment 2 is the same as that in FIG. 1.

Next, operation of the vehicle control device 100 according to embodiment 3 will be described using FIG. 6, with reference to FIG. 7.

Figure 6:
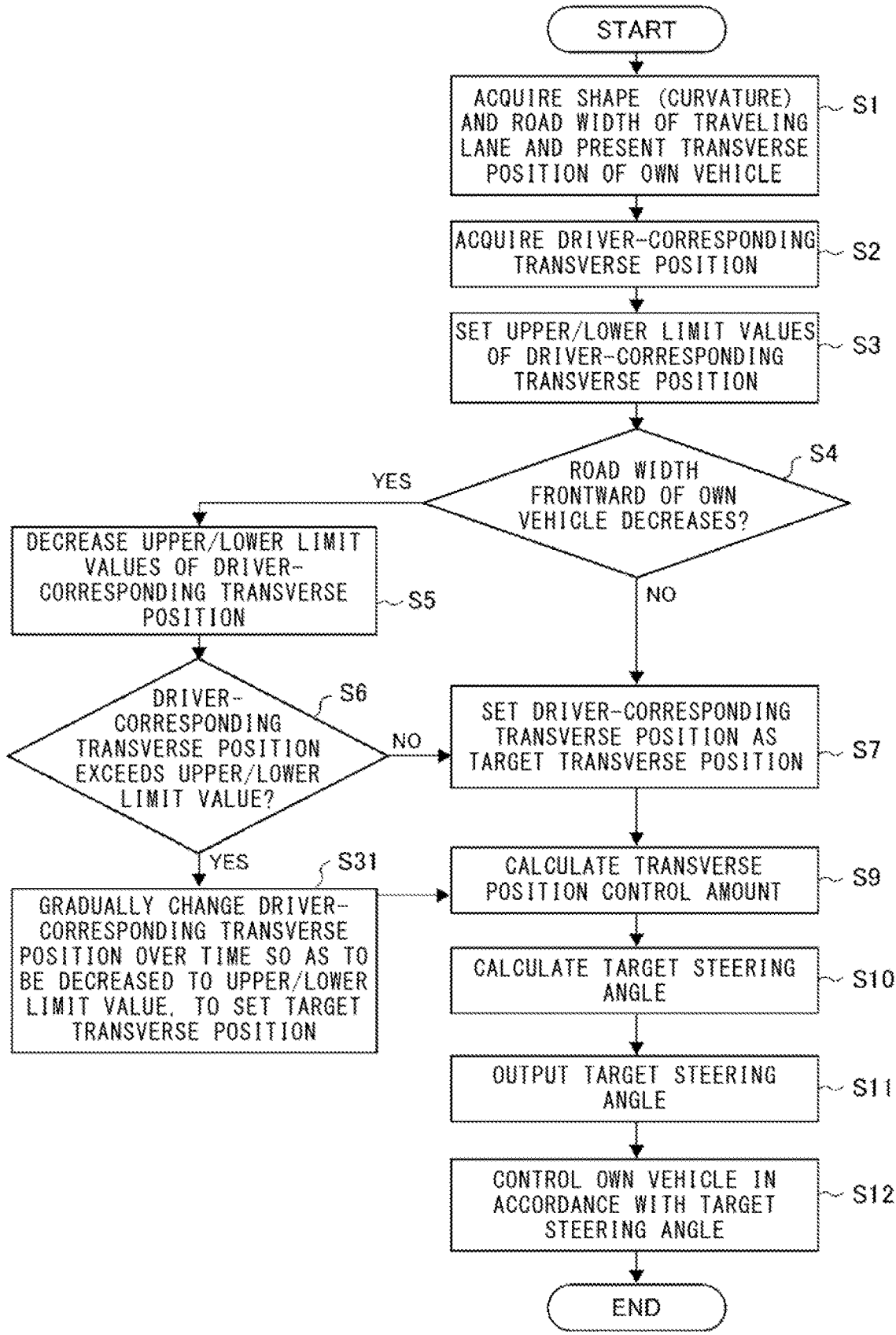
FIG. 6 is a flowchart showing a vehicle control method in a vehicle control device according to embodiment 3.

Step S1 to step S7 and step S9 to step S12 in FIG. 6 are the same processes as those in FIG. 2.

In step S6, if the transverse position control amount calculation unit 14 determines that the driver-corresponding transverse position exceeds the upper/lower limit value (YES in step S6), in step S31, the transverse position control amount calculation unit 14 gradually changes the driver-corresponding transverse position over time so as to be decreased to the upper/lower limit value, to set the target transverse position. Then, the process proceeds to step S9.

As shown in FIG. 7, in the case where the road width frontward of the own vehicle decreases and the driver-corresponding transverse position exceeds the upper/lower limit value, the value of the driver-corresponding transverse position to be set as the target transverse position is gradually changed over time as shown by the arrow 85, thus performing such traveling as to eliminate the driver's anxiety.

According to embodiment 3, in a case where the road width frontward of the own vehicle decreases, the upper/lower limit values of the driver-corresponding transverse position are decreased, and the driver-corresponding transverse position to be decreased to the upper/lower limit value is gradually changed over time, to be set as the target transverse position.

Thus, it is possible to perform traveling that is safe and prioritizes ride comfort based on the driver's preference.

Embodiment 4

Figure 8:
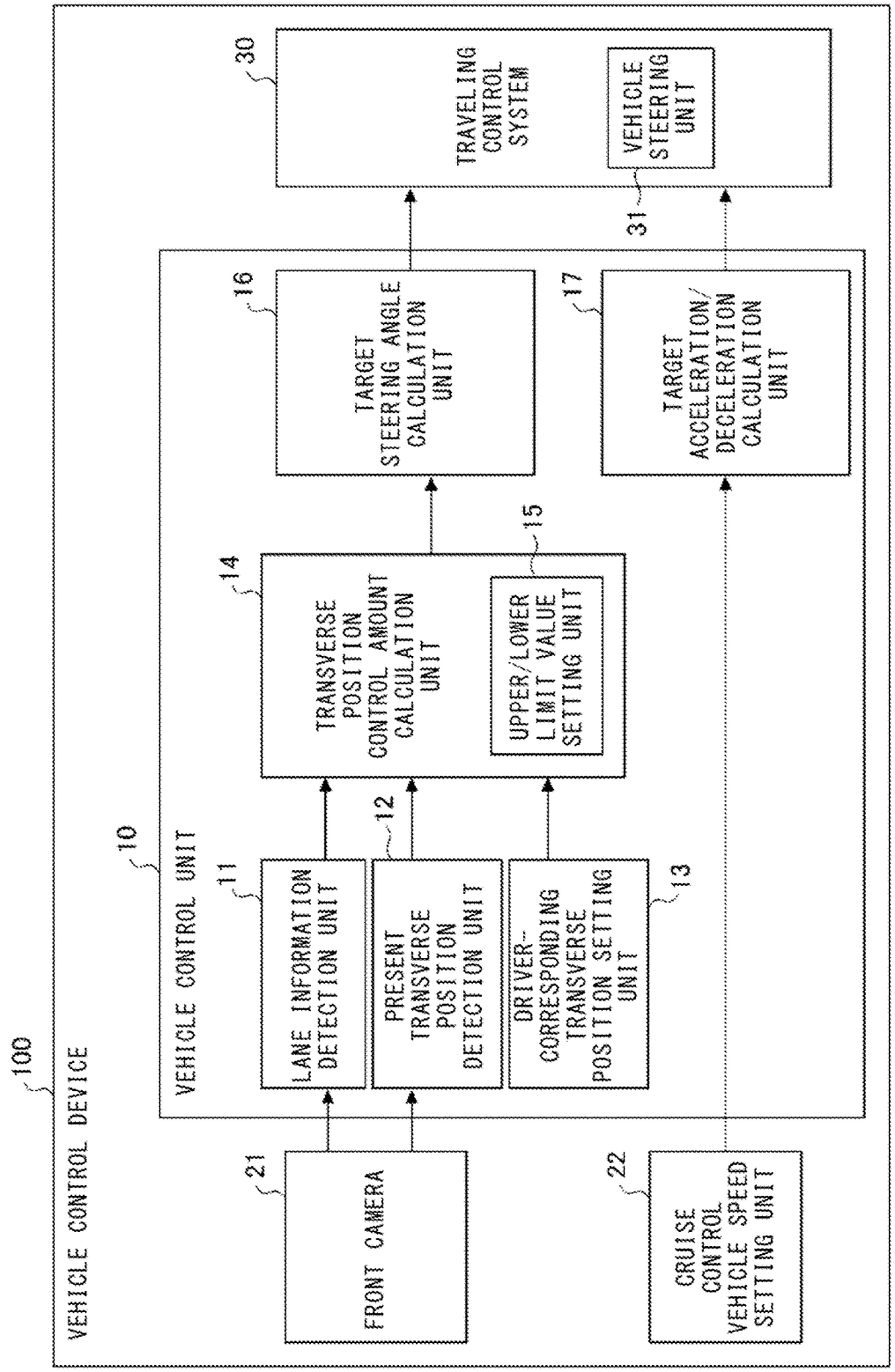
FIG. 8 is a block diagram showing the configuration of a vehicle control device according to embodiment 4.

FIG. 8 is a block diagram showing the configuration of a vehicle control device according to embodiment 4.

In FIG. 8, reference characters 10 to 16, 21, 30, 31, 100 are the same as those in FIG. 1. In FIG. 8, the vehicle control device 100 is provided with a cruise control vehicle speed setting unit 22, and the vehicle control unit 10 is provided with a target acceleration/deceleration calculation unit 17.

The cruise control vehicle speed setting unit 22 is for setting a cruise control target vehicle speed desired by the driver. When the cruise control vehicle speed setting unit 22 outputs the cruise control target vehicle speed, the target acceleration/deceleration calculation unit 17 issues a target acceleration/deceleration to an accelerator/brake so that the present vehicle speed coincides with the cruise control target vehicle speed, thus controlling the vehicle speed.

Figure 10:
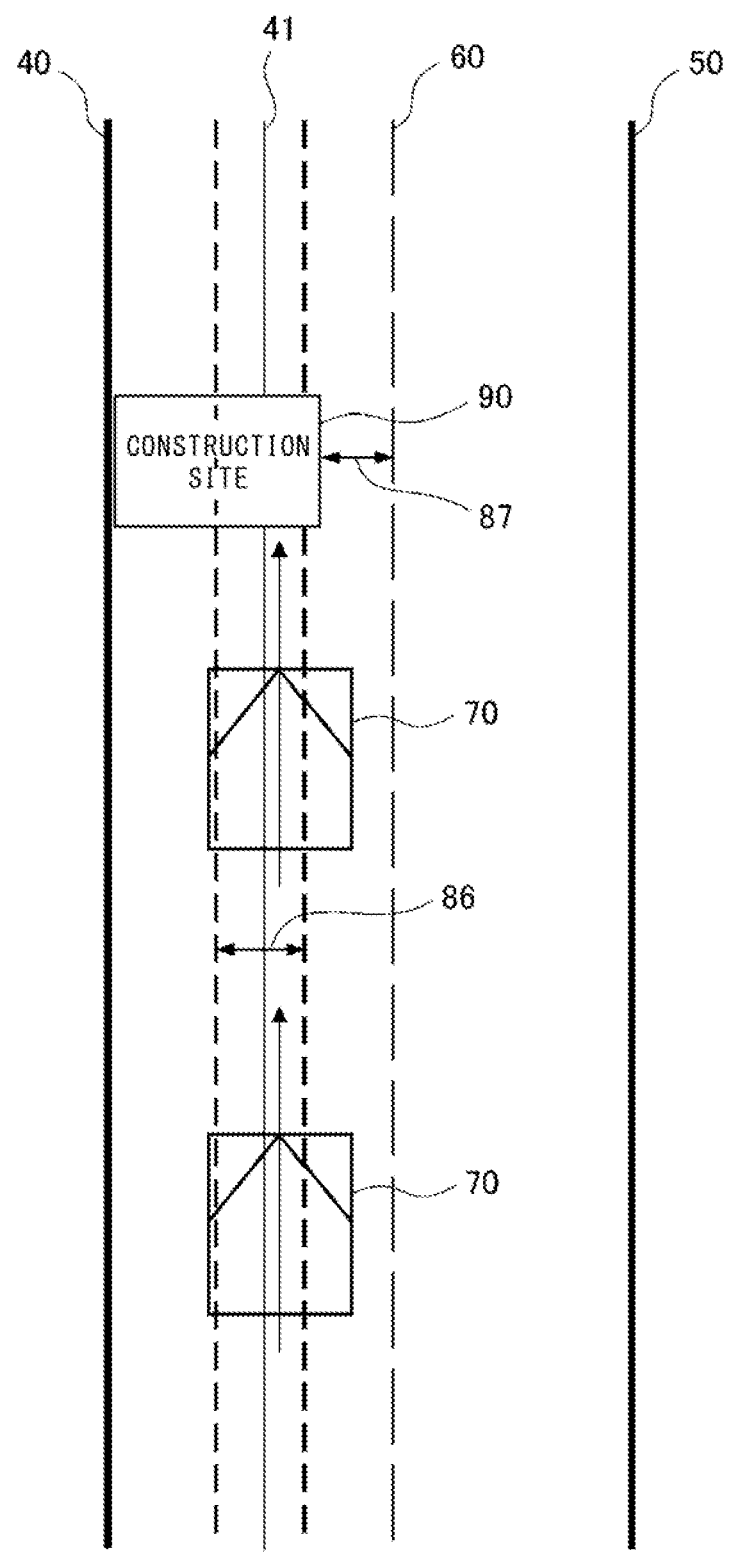
FIG. 10 is a conceptual view showing movement of an own vehicle on which the vehicle control device according to embodiment 4 is mounted.

FIG. 10 is a conceptual view showing movement of the own vehicle on which the vehicle control device according to embodiment 4 is mounted.

In FIG. 10, reference characters 40, 41, 50, 60, 70 are the same as those in FIG. 3. FIG. 10 shows a case where there is a construction site 90 on a road. Upper/lower limit values 86 of the driver-corresponding transverse position, and a traveling possible road width 87 at the construction site 90, are shown. In a case where the upper/lower limit values 86 of the driver-corresponding transverse position exceed the traveling possible road width 87, the own vehicle 70 is stopped.

Embodiment 1 and embodiment 3 have shown the examples in which, when the road width frontward of the own vehicle decreases, the upper/lower limit values of the driver-corresponding transverse position are decreased, so as to perform traveling that is safe and based on the driver's preference.

However, as shown in FIG. 10, in a case where the construction site 90 or the like is present frontward of the own vehicle and the traveling possible road width 87 frontward of the own vehicle is smaller than the upper/lower limit values 86 of the driver-corresponding transverse position, there is a possibility that a following vehicle approaches on the adjacent lane, so that the occupant feels anxiety.

Embodiment 4 addresses such a case.

Next, operation will be described.

Operation of the vehicle control device 100 according to embodiment 3 will be described using FIG. 9, with reference to FIG. 10.

Figure 9:
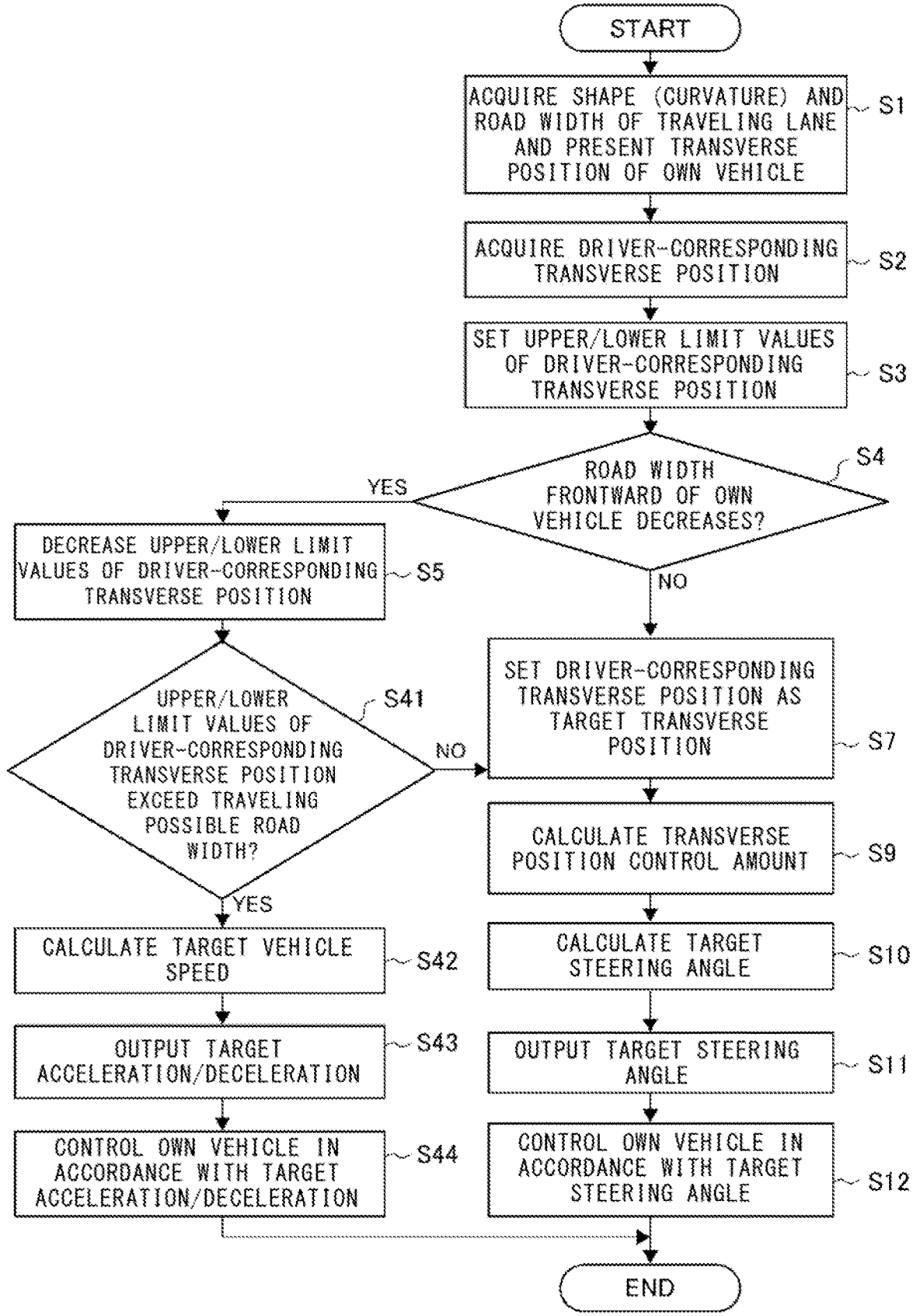
FIG. 9 is a flowchart showing a vehicle control method in the vehicle control device according to embodiment 4.

Step S1 to step S5, step S7, and step S9 to step S12 in FIG. 9 are the same processes as those in FIG. 2.

In step S41 subsequent to step S5, for safe traveling on the road, the transverse position control amount calculation unit 14 compares the upper/lower limit values 86 of the driver-corresponding transverse position with the traveling possible road width 87, and determines whether or not the upper/lower limit values 86 of the driver-corresponding transverse position are greater than the traveling possible road width 87.

In the case of NO, the process proceeds to step S7, and the subsequent process is the same as in embodiment 1 and embodiment 3. In the case of YES, the process proceeds to step S42.

In step S42, the target acceleration/deceleration calculation unit 17 calculates the target vehicle speed by using the value of the cruise control target vehicle speed outputted from the cruise control vehicle speed setting unit 22.

Next, in step S43 (ninth step), the target acceleration/deceleration calculation unit 17 calculates and outputs the target acceleration/deceleration.

Then, in step S44 (ninth step), the traveling control system 30 controls the own vehicle in accordance with the target acceleration/deceleration.

For example, in FIG. 10, in the case where the construction site 90 or the like is present frontward of the own vehicle and the road width frontward of the own vehicle decreases, the traveling possible road width 87 and the upper/lower limit values 86 of the driver-corresponding transverse position are compared with each other. Then, if the upper/lower limit values 86 of the driver-corresponding transverse position are greater, the speed of the own vehicle is controlled in accordance with the target acceleration/deceleration, to stop the own vehicle.

Here, the time until the own vehicle is stopped is several seconds from when, as the condition, the upper/lower limit values 86 of the driver-corresponding transverse position are determined to be greater.

According to embodiment 4, in a case where the road width frontward of the own vehicle decreases and the upper/lower limit values 86 of the driver-corresponding transverse position are greater than the traveling possible road width 87, the own vehicle 70 is stopped.

Thus, it is possible to perform traveling that is safe and prioritizes ride comfort based on the driver's preference.

Embodiment 5

Figure 11:
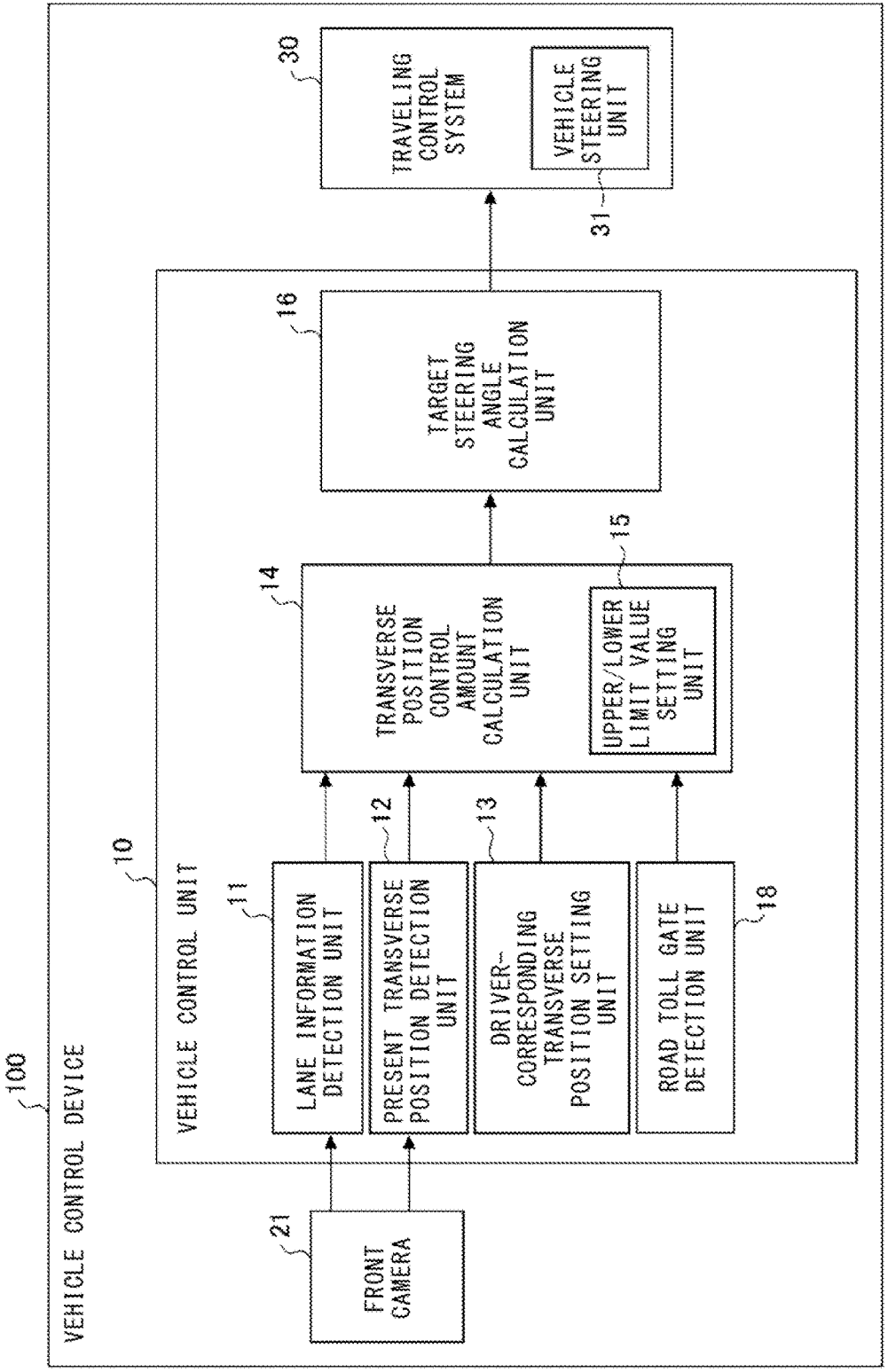
FIG. 11 is a block diagram showing the configuration of a vehicle control device according to embodiment 5.

FIG. 11 is a block diagram showing the configuration of a vehicle control device according to embodiment 5.

In FIG. 11, reference characters 10 to 16, 21, 30, 31, 100 are the same as those in FIG. 1. In FIG. 11, the vehicle control unit 10 is provided with a road toll gate detection unit 18. The road toll gate detection unit 18 detects the position of a road toll gate frontward of the own vehicle from the frontward video taken by the front camera 21.

Figure 13:
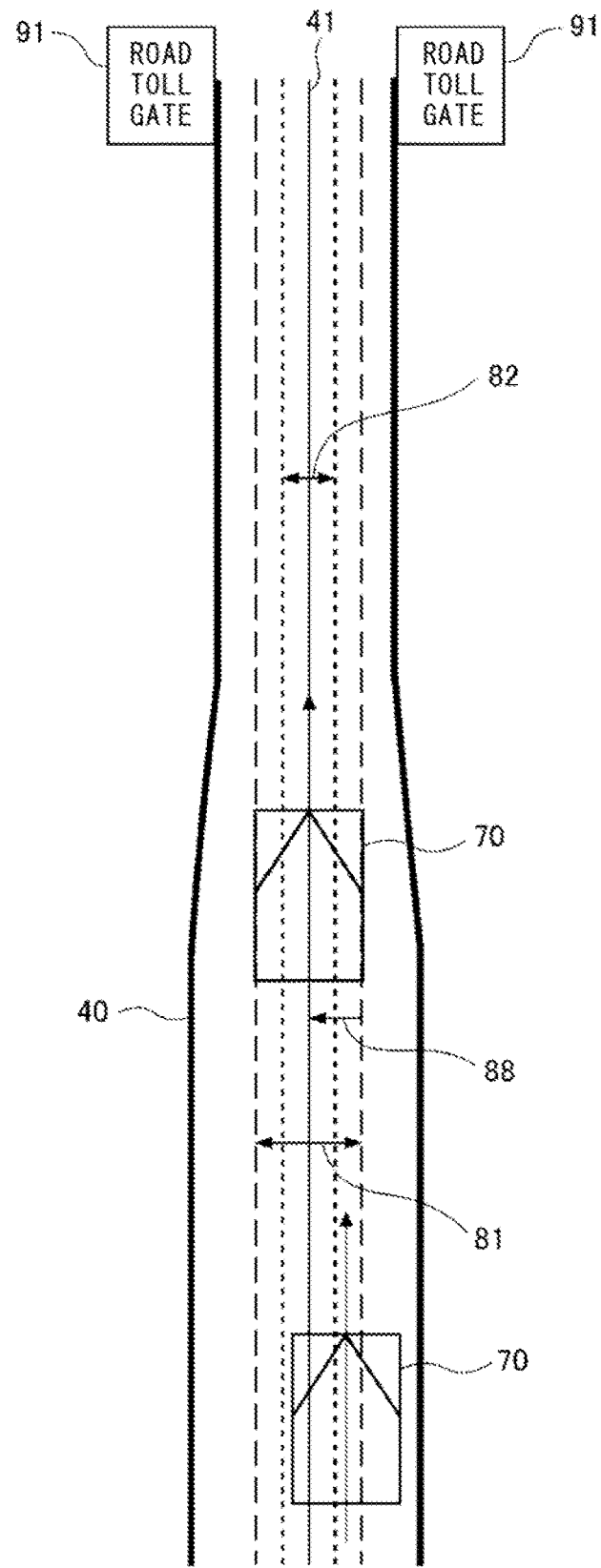
FIG. 13 is a conceptual view showing movement of an own vehicle on which the vehicle control device according to embodiment 5 is mounted.

FIG. 13 is a conceptual view showing movement of the own vehicle on which the vehicle control device according to embodiment 5 is mounted.

In FIG. 13, reference characters 40, 41, 70, 81, 82 are the same as those in FIG. 3. In FIG. 13, an arrow 88 indicates that the own vehicle 70 moves back toward the lane center when a road toll gate 91 is detected by the road toll gate detection unit 18.

In embodiment 5, in a case where the road toll gate 91 frontward of the own vehicle is detected, the lane center 41 is set as the target transverse position, in order to safely pass the road toll gate 91.

Meanwhile, in a case where the road width frontward of the own vehicle changes, as in embodiment 1 and embodiment 2, the upper/lower limit values of the driver-corresponding transverse position are set in accordance with the road width.

Thus, the driver can safely pass the road toll gate 91 and perform traveling based on the driver's preference.

Next, operation will be described.

Operation of the vehicle control device 100 according to embodiment 5 will be described using FIG. 12, with reference to FIG. 13.

Figure 12:
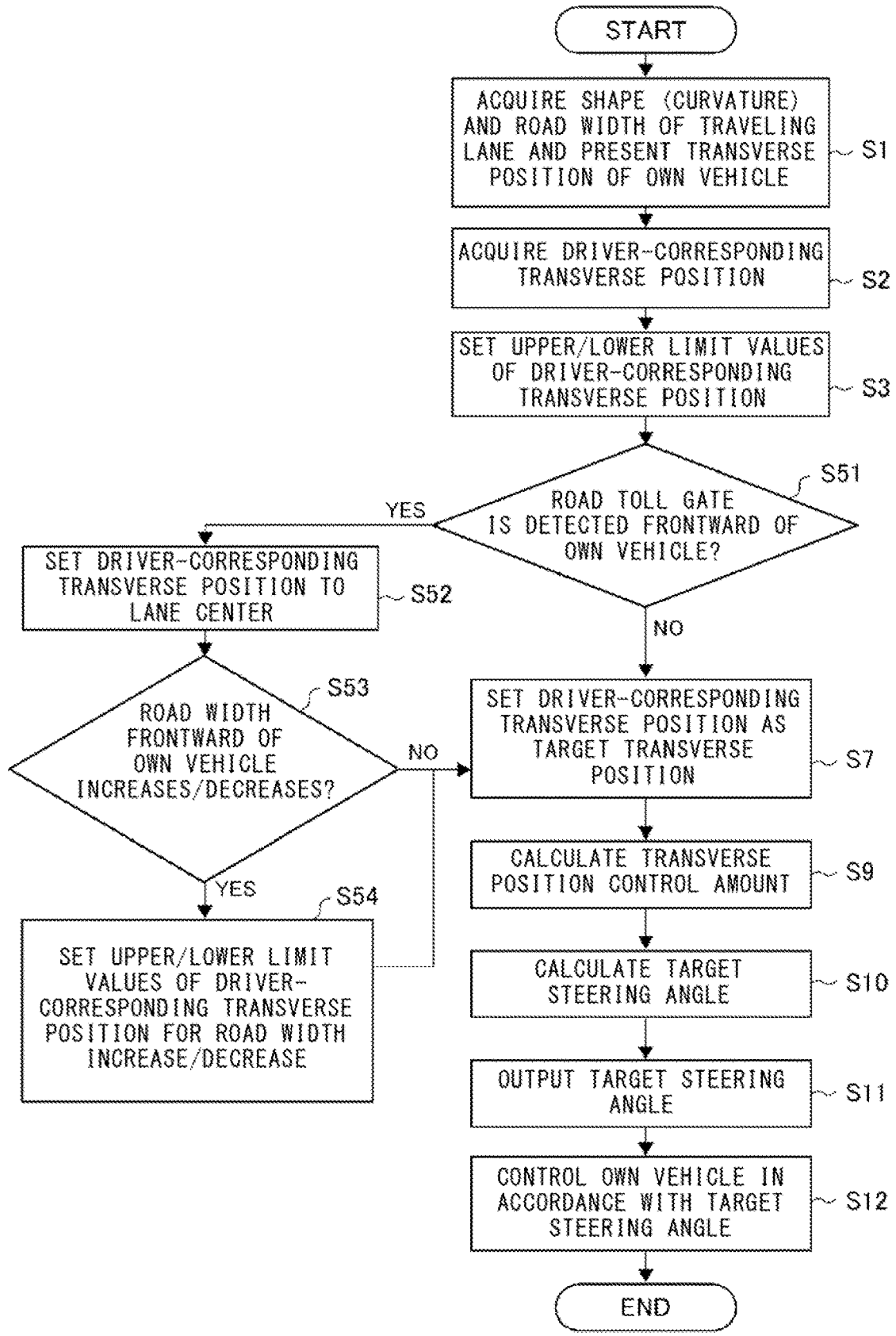
FIG. 12 is a flowchart showing a vehicle control method in the vehicle control device according to embodiment 5.

Step S1 to step S3, step S7, and step S9 to step S12 in FIG. 12 are the same processes as those in FIG. 2.

In step S51 (tenth step) subsequent to step S3, whether or not the road toll gate detection unit 18 has detected a road toll gate 91 frontward of the own vehicle from the frontward video taken by the front camera 21, is determined.

If the road toll gate 91 is not detected (NO in step S51), the process proceeds to step S7.

If the road toll gate 91 is detected (YES in step S51), in step S52 (eleventh step), the transverse position control amount calculation unit 14 sets the position of the lane center 41 as the driver-corresponding transverse position, in order to safely pass the road toll gate 91. Then, the process proceeds to step S53.

In step S52, as shown in FIG. 13, since the road toll gate 91 is detected frontward of the own vehicle, the own vehicle 70 is controlled to move back to the lane center 41.

In step S53, the transverse position control amount calculation unit 14 determines whether or not the road width frontward of the own vehicle increases/decreases, on the basis of the frontward video from the front camera 21.

If the road width does not increase/decrease (NO in step S53), the process proceeds to step S7.

On the other hand, if the road width increases/decreases (YES in step S53), in step S54, the upper/lower limit value setting unit 15 sets the upper/lower limit values for road width increase/decrease on the basis of the driver's preference.

In step S54, as in embodiment 1 and embodiment 2, traveling may be performed by changing only one of the upper/lower limit values of the driver-corresponding transverse position in accordance with the preference.

In the example shown in FIG. 13, in the case where the road toll gate 91 is detected and the road width frontward of the own vehicle decreases, the upper/lower limit values of the driver-corresponding transverse position are decreased to the upper/lower limit values 82 for road width decrease, thereby enabling traveling that is safe and based on the driver's preference.

According to embodiment 5, in a case where the road toll gate 91 frontward of the own vehicle is detected and the road width frontward of the own vehicle increases/decreases, the driver-corresponding transverse position is set to the lane center, and thereafter, it is possible to freely travel within the upper/lower limit values of the driver-corresponding transverse position for road width increase/decrease.

Thus, it is possible to perform traveling that is safe and prioritizes ride comfort based on the driver's preference.

In the above description of the embodiments, when the road width frontward of the own vehicle decreases, the transverse position control amount calculation unit 14 sets the upper/lower limit values of the driver-corresponding transverse position, to ±0.5 m. However, the upper/lower limit values may not necessarily be set to the above values. For example, in a case where a following vehicle is present on an adjacent lane and is approaching the own vehicle, the upper/lower limit values may be changed to ±0.3 m or the like.

In the above description of embodiment 3, when the road width frontward of the own vehicle decreases and the driver-corresponding transverse position exceeds the upper/lower limit value, the transverse position control amount calculation unit 14 sets the driver-corresponding transverse position so as to be gradually changed, in order to prevent the own vehicle from immediately moving back toward the center side. However, if the driver desires to improve quick response, the change may be immediately performed.

In the above description of the embodiments, when the road width frontward of the own vehicle increases/decreases, the upper/lower limit values of the driver-corresponding transverse position are changed. However, the upper/lower limit values may not necessarily be changed. Whether or not to perform the change may be selected in accordance with the driver's intention.

In the above description of the embodiments, when the road width frontward of the own vehicle increases/decreases and the upper/lower limit values of the driver-corresponding transverse position are changed, the transverse position control amount calculation unit 14 may notify the driver of the own vehicle accordingly, using a display or a loudspeaker mounted on the own vehicle.

The notification of change of the upper/lower limit values of the driver-corresponding transverse position can make the driver feel secure.

In the above description of the embodiments, the video frontward of the own vehicle taken by the front camera 21 is analyzed to detect the present transverse position of the own vehicle and the lane shape of the road. However, using road map data and detection of the own vehicle position by an artificial satellite, the relative positions of the own vehicle and the road, and the lane shape of the road, may be detected.

Figure 14:
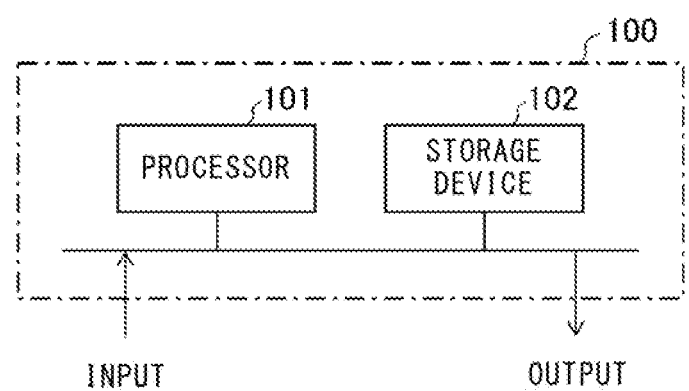
FIG. 14 is a diagram showing the hardware configuration of the vehicle control devices according to embodiments 1 to 5.

As shown in FIG. 14 which shows a hardware example, the vehicle control device 100 is composed of a processor 101 and a storage device 102. The storage device is provided with a volatile storage device such as a random access memory, and a nonvolatile auxiliary storage device such as a flash memory, though they are not shown. Instead of a flash memory, an auxiliary storage device of a hard disk may be provided. The processor 101 executes a program inputted from the storage device 102. In this case, the program is inputted from the auxiliary storage device to the processor 101 via the volatile storage device. The processor 101 may output data such as a calculation result to the volatile storage device of the storage device 102, or may store such data into the auxiliary storage device via the volatile storage device.

Although the disclosure is described above in terms of various exemplary embodiments and implementations, it should be understood that the various features, aspects, and functionality described in one or more of the individual embodiments are not limited in their applicability to the particular embodiment with which they are described, but instead can be applied, alone or in various combinations to one or more of the embodiments of the disclosure.

It is therefore understood that numerous modifications which have not been exemplified can be devised without departing from the scope of the present disclosure. For example, at least one of the constituent components may be modified, added, or eliminated. At least one of the constituent components mentioned in at least one of the preferred embodiments may be selected and combined with the constituent components mentioned in another preferred embodiment.

DESCRIPTION OF THE REFERENCE CHARACTERS

10 vehicle control unit
11 lane information detection unit
12 present transverse position detection unit
13 driver-corresponding transverse position setting unit
14 transverse position control amount calculation unit
15 upper/lower limit value setting unit
16 target steering angle calculation unit
17 target acceleration/deceleration calculation unit
18 road toll gate detection unit
21 front camera
22 cruise control vehicle speed setting unit
30 traveling control system
31 vehicle steering unit
40 first lane
41 lane center
50 second lane
60 center line
70 own vehicle
81 normal upper/lower limit value
82 upper/lower limit value for road width decrease
83 arrow
84 upper/lower limit value for road width increase
85 arrow
86 upper/lower limit value of driver-corresponding transverse position
87 traveling possible road width
88 arrow
90 construction site
91 road toll gate
100 vehicle control device
101 processor
102 storage device

The invention claimed is:

1. A vehicle control device mounted on a vehicle and configured to control traveling of the vehicle, the vehicle control device comprising:
   at least one processor; and
   at least one memory including computer program code, where the at least one memory and the computer program code are configured, with the at least one processor, to cause the vehicle control device to at least:
   detect a shape and a road width of a traveling lane of the vehicle;
   detect a present transverse position indicating a position of the vehicle in a width direction of the traveling lane where the vehicle is traveling at present;

set a driver-corresponding transverse position indicating a position of the vehicle in the width direction of the traveling lane so as to correspond to a driving tendency of a driver of the vehicle;

set upper/lower limit values that the driver-corresponding transverse position is allowed to take, in accordance with the road width;

set, as a target transverse position, the driver-corresponding transverse position within the upper/lower limit values, and calculate a transverse position control amount for the vehicle from the present transverse position of the vehicle;

calculate a target steering angle for the vehicle on the basis of the transverse position control amount and the shape of the traveling lane; and steer the vehicle on the basis of the target steering angle, wherein when change in the road width is detected and there is no road toll gate detected in a forward direction of the vehicle, the transverse position control amount for the vehicle is calculated on the basis of the upper/lower limit values in which the change in the road width is reflected.

2. The vehicle control device according to claim 1, wherein when the change in the road width is detected, the at least one processor gradually changes the driver-corresponding transverse position over time so as to be within the upper/lower limit values in which the change in the road width is reflected, and calculates the transverse position control amount for the vehicle.

3. The vehicle control device according to claim 1, wherein the at least one processor calculates a target acceleration/deceleration for the vehicle and controls a vehicle speed of the vehicle, wherein when a width of the upper/lower limit values is greater than the road width, the at least one processor performs control to stop traveling of the vehicle.

4. The vehicle control device according to claim 3, wherein the at least one processor performs control to stop traveling of the vehicle after a predetermined time has elapsed from when the width of the upper/lower limit values is determined to be greater than the road width.

5. The vehicle control device according to claim 1, further comprising a road toll gate detector for detecting a road toll gate present frontward in a traveling direction of the vehicle, wherein when the change in the road width is detected and the road toll gate is detected by the road toll gate detector, the at least one processor calculates the transverse position control amount for the vehicle by setting a lane center of the traveling lane as the target transverse position.

6. The vehicle control device according to claim 1, wherein when decrease in the road width is detected, the at least one processor changes the upper/lower limit values in a center direction of the traveling lane in accordance with the decrease in the road width.

7. The vehicle control device according to claim 1, wherein when increase in the road width is detected, the at least one processor changes the upper/lower limit values in a direction opposite to a center direction of the traveling lane in accordance with the increase in the road width.

8. The vehicle control device according to claim 6, wherein the change of the upper/lower limit values is to change each of the upper limit value and the lower limit value in the center direction of the traveling lane.

9. The vehicle control device according to claim 7, wherein the change of the upper/lower limit values is to change each of the upper limit value and the lower limit value in the direction opposite to the center direction of the traveling lane.

10. The vehicle control device according to claim 6, wherein the change of the upper/lower limit values is to keep one of the upper limit value or the lower limit value as a fixed value, and change the other one in the center direction of the traveling lane.

11. The vehicle control device according to claim 7, wherein the change of the upper/lower limit values is to keep one of the upper limit value or the lower limit value as a fixed value, and change the other one in the direction opposite to the center direction of the traveling lane.

12. A vehicle control method comprising:

a first step detects a road width of a traveling lane of a vehicle and detects a present transverse position indicating a position of the vehicle in a width direction of the traveling lane where the vehicle is traveling at present;

a second step sets a driver-corresponding transverse position indicating a position of the vehicle in the width direction of the traveling lane so as to correspond to a driving tendency of a driver of the vehicle;

a third step sets upper/lower limit values that the driver-corresponding transverse position is allowed to take, in accordance with the road width;

a fourth step detects change in the road width detected in the first step;

a fifth step, when the change in the road width is detected in the fourth step, changes the upper/lower limit values in accordance with the change in the road width;

a sixth step sets, as a target transverse position, the driver-corresponding transverse position within the upper/lower limit values changed in accordance with the change in the road width in the fifth step, and calculates a transverse position control amount for the vehicle from the present transverse position of the vehicle;

a seventh step calculates a target steering angle for the vehicle on the basis of the transverse position control amount calculated in the sixth step; and an eighth step steers the vehicle on the basis of the target steering angle calculated in the seventh step.

13. The vehicle control method according to claim 12, wherein in the sixth step, when the change in the road width is detected in the fourth step, the driver-corresponding transverse position is gradually changed over time so as to be within the upper/lower limit values changed in accordance with the change in the road width, and the transverse position control amount for the vehicle is calculated.

14. The vehicle control method according to claim 12, further comprising a ninth step calculates a target acceleration/deceleration for the vehicle and controls a vehicle speed of the vehicle, wherein in the ninth step, control is performed to stop traveling of the vehicle, when a width of the upper/lower limit values is greater than the road width.

15. The vehicle control method according to claim 14, wherein
in the ninth step, control is performed to stop traveling of the vehicle after a predetermined time has elapsed from when the width of the upper/lower limit values is determined to be greater than the road width.

16. The vehicle control method according to claim 12, further comprising:
a tenth step detects a road toll gate present frontward in a traveling direction of the vehicle; and
an eleventh step, when the road toll gate is detected in the tenth step, sets the driver-corresponding transverse position to a center of the traveling lane, wherein
the fourth step is performed after the eleventh step is performed.

17. The vehicle control method according to claim 12, wherein
in the fifth step, when decrease in the road width is detected in the fourth step, the upper/lower limit values are changed in a center direction of the traveling lane in accordance with the decrease in the road width.

18. The vehicle control method according to claim 12, wherein
in the fifth step, when increase in the road width is detected in the fourth step, the upper/lower limit values are changed in a direction opposite to a center direction of the traveling lane in accordance with the increase in the road width.

19. The vehicle control method according to claim 17, wherein
the change of the upper/lower limit values in the fifth step is to change each of the upper limit value and the lower limit value in the center direction of the traveling lane.

20. The vehicle control method according to claim 18, wherein
the change of the upper/lower limit values in the fifth step is to change each of the upper limit value and the lower limit value in the direction opposite to the center direction of the traveling lane.

21. The vehicle control method according to claim 17, wherein
the change of the upper/lower limit values in the fifth step is to keep one of the upper limit value or the lower limit value as a fixed value, and change the other one in the center direction of the traveling lane.

22. The vehicle control method according to claim 18, wherein
the change of the upper/lower limit values in the fifth step is to keep one of the upper limit value or the lower limit value as a fixed value, and change the other one in the direction opposite to the center direction of the traveling lane.

* * * * *